(No Model.)

D. I. LYBE.
TIRE TIGHTENER.

No. 561,598. Patented June 9, 1896.

Witnesses
W. H. Doyle
H. H. Riley

Inventor
Daniel I. Lybe.
By his Attorneys,
C. A. Snow & Co.

UNITED STATES PATENT OFFICE.

DANIEL I. LYBE, OF SIDNEY, IOWA.

TIRE-TIGHTENER.

SPECIFICATION forming part of Letters Patent No. 561,598, dated June 9, 1896.

Application filed April 11, 1895. Serial No. 545,321. (No model.)

*To all whom it may concern:*

Be it known that I, DANIEL I. LYBE, a citizen of the United States, residing at Sidney, in the county of Fremont and State of Iowa, have invented a new and useful Tire-Tightener, of which the following is a specification.

The invention relates to improvements in tire-tighteners.

The object of the present invention is to provide a simple and inexpensive device adapted to be readily applied to the ordinary construction of spoke and felly and capable of presenting a tenon-like portion to fit in the opening or spoke-socket of the felly and of enabling the tire to be readily tightened without shortening it to effect the same result.

The invention consists in the construction and novel combination and arrangement of parts hereinafter fully described, illustrated in the accompanying drawings, and pointed out in the claim hereto appended.

Figure 1:
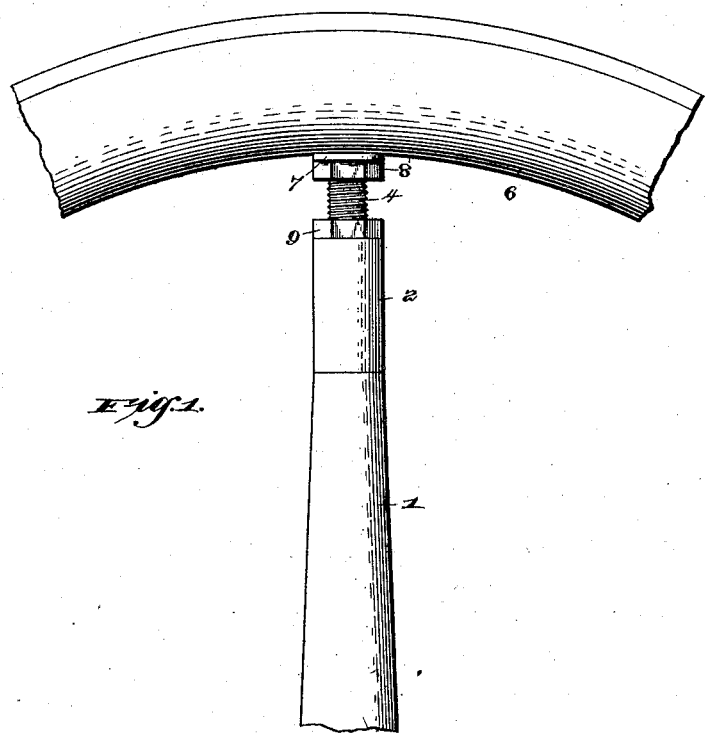
Figure 2:
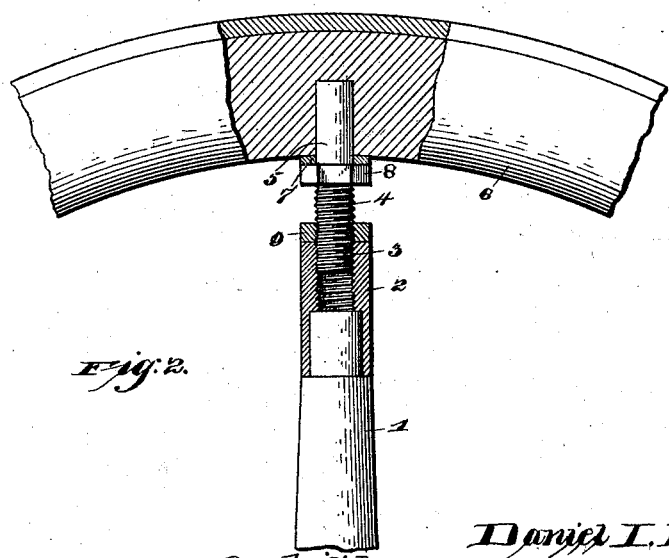

In the drawings, Figure 1 is an elevation of a portion of a wheel provided with a tire-tightener constructed in accordance with this invention. Fig. 2 is a sectional view of the same, taken longitudinally of one of the spokes.

Like numerals of reference indicate corresponding parts in both figures of the drawings.

1 designates a spoke provided on its outer end with a ferrule or thimble 2, provided at its outer end with a threaded socket 3, receiving an adjusting-screw 4. The adjusting-screw 4 has a smooth outer extremity 5, fitting in a socket or opening of a felly 6, and at the inner terminus of the smooth portion 5 is arranged a fixed collar or flange, forming a shoulder for supporting the felly. A washer 7 is interposed between the fixed collar or flange 8 and the felly 6 to avoid wearing the latter, and when it is desired to tighten the tire the screw 4 is rotated to expand the felly and force the same outward into closer contact with the tire. The fixed collar or flange 8 may be provided with a perforation to be engaged by a pin or the like, or it may be square, hexagonal, or of any other polygonal shape, to form a wrench-seat to enable the screw to be readily turned by an ordinary wrench when it is desired to tighten the tire.

After the screw 4 has been set and the parts properly adjusted the screw is retained against accidental inward movement to prevent any loosening of the parts from this cause by a jam-nut 9, arranged on the screw and adapted to be turned against the outer end of the ferrule or thimble 2. The jam-nut 9 engages the fixed or stationary thimble 2, and there is sufficient space between it and the flange or collar 8 to enable it to be freely rotated to release the adjusting-screw.

In the application of my invention to tire-tighteners or to wheels it will be apparent that by rotating the screw the parts may be readily tightened to take up any slack, or the tire and other parts may be loosened, if desired, and the jam-nut will lock the screw at any desired adjustment and will prevent any accidental rotation of the same.

The smooth portion 5 of the screw takes the place of the usual tenon of the spoke, and it will be readily apparent that exceedingly simple and inexpensive means are provided for taking up any looseness of a wheel and that it obviates the necessity of shortening a tire to tighten the same. It will also be apparent that the tire-tightener is readily applicable to the ordinary construction of vehicle-wheels and the like.

Changes in the form, proportion, and the minor details of construction may be resorted to without departing from the principle or sacrificing any of the advantages of this invention.

What I claim is—

The combination with a spoke, and a felly provided with a cylindrical tenon-opening, of a stationary thimble fixed to the outer end of the spoke and provided with a threaded socket, an adjusting-screw capable of rotation and having an inner threaded portion and a smooth cylindrical tenon-like outer portion formed integral with the threaded portion and fitting in the tenon-opening of the felly and capable of rotation therein, said screw having its inner threaded portion arranged in the threaded socket of the fixed thimble, the fixed collar or flange 8 arranged at the inner terminals of the smooth and threaded portions of the screw and forming a wrench-seat and located adjacent to the inner edge of the felly and adapted to force the latter outward away from the spoke to tighten the tire, and a jam-nut arranged on the threaded portion of the screw and engaging the outer end of the fixed or stationary thimble, a space being provided between the jam-nut and the fixed collar or flange 8 to enable the jam-nut to be readily unscrewed to release the screw, substantially as described.

In testimony that I claim the foregoing as my own I have hereto affixed my signature in the presence of two witnesses.

DANIEL I. LYBE.

Witnesses:
WM. A. FORBES,
JAS. H. MCDONALD.